Figure 1:
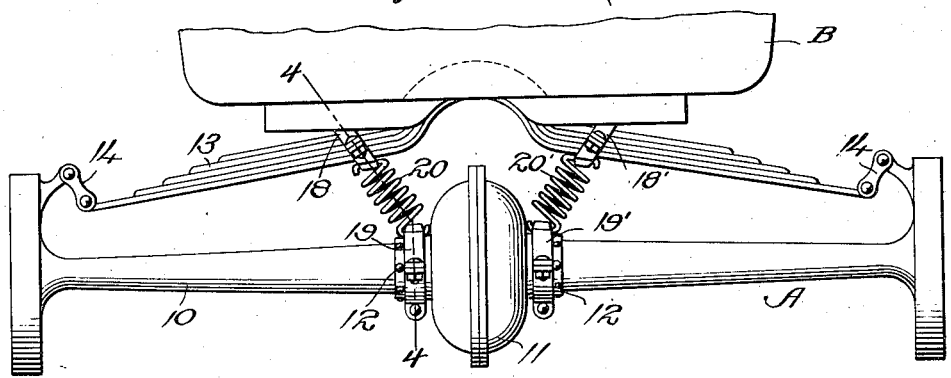

Mar. 13, 1923.

H. C. SCHMIDT ET AL

SHOCK ABSORBER

Filed Apr. 7, 1920

1,448,282

2 sheets-sheet 1

Inventor
Creedy C. Sheppard,
Herman C Schmidt,
By Henry P Bright
Attorney

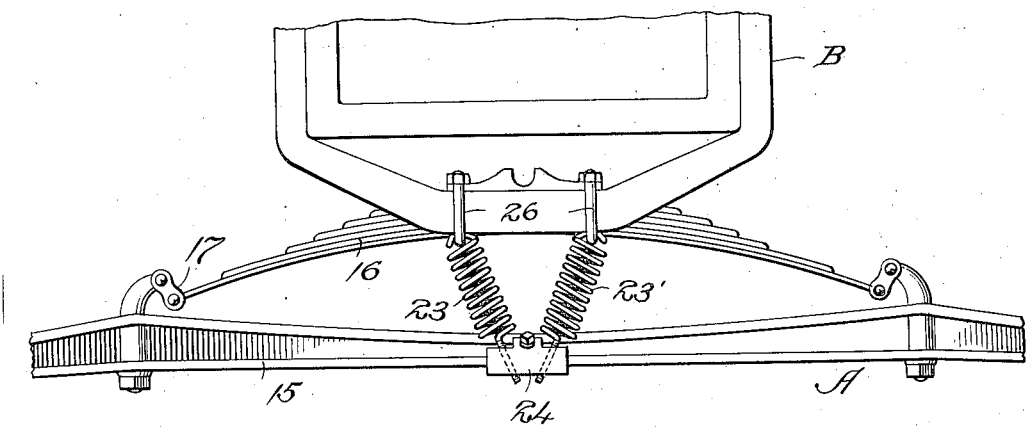
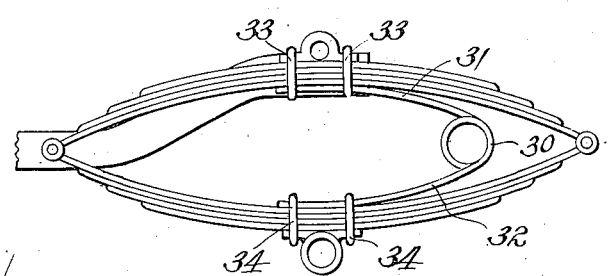
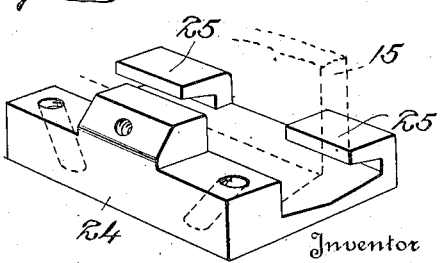

Patented Mar. 13, 1923.

1,448,282

UNITED STATES PATENT OFFICE.

HERMAN C. SCHMIDT AND CREEDY C. SHEPPARD, OF WASHINGTON, DISTRICT OF COLUMBIA.

SHOCK ABSORBER.

Application filed April 7, 1920. Serial No. 372,025.

*To all whom it may concern:*

Be it known that we, HERMAN C. SCHMIDT and CREEDY C. SHEPPARD, citizens of the United States, residing at Washington, in the District of Columbia, have invented certain new and useful Improvements in Shock Absorbers, set forth in the annexed specification.

Our invention relates to devices for minimizing vertical and side sway movements and absorbing the shocks and jars of yieldably supported vehicle bodies during their travel over uneven surfaces.

It is well known that the riding qualities of a vehicle are most comfortable and steady when the main body springs are subjected to their normal load, the reason being that the load prevents excessive compression and rebound movements of the springs and decreases vibrations. Besides producing the most effective riding qualities a loaded condition of the springs greatly reduces wear and tear upon other parts of the vehicle.

Experiments have demonstrated that by producing an artificial load upon the main vehicle springs the heretofore objectionable motions of vehicles may be effectively controlled and since a vehicle spring is constructed to satisfy the requirements of the vehicle body when the body is loaded to its capacity it has further been determined that an artificial load of substantially the normal or capacity load of the springs results in a production of the easiest riding tension thereon, although it is conceivable that in some cases the most effective artificial load may be greater or less than the normal load of the springs.

The purpose of our invention is to provide means for producing an artificial load upon vehicle springs to cause the vehicle springs to function less harshly than when unloaded and at the same time provide a means for producing such artificial load which will also act as a buffer against downward movement of the vehicle body and as a cushion or check against its upward or rebound movement, and such means at the same time serving to enhance the life of the vehicle springs by subjecting them to substantially uniform stress within the predetermined maximum load capacity of the springs.

An important characteristic and advantage of the means we have provided for accomplishing the purposes aforementioned resides in the fact that the maximum efficiency of our artificial load producing means for buffing and checking the action of the vehicle springs is not exerted until the vehicle springs are subjected to excessive strains, when the power of such means is exerted in increasing ratio to compensate the tensions of the vehicle springs.

Our invention consists in the construction and arrangement of auxiliary springs or similarly acting elastic devices to operate in conjunction with the springs or spring supported part of a vehicle and the running gear whereby a massless artificial load is produced upon the main vehicle springs by an extremely simple practical and inexpensive device which will also function to produce the additional desirable results to which we have previously referred.

In the accompanying drawings, illustrative of a preferred embodiment of the invention:—

Figure 2:
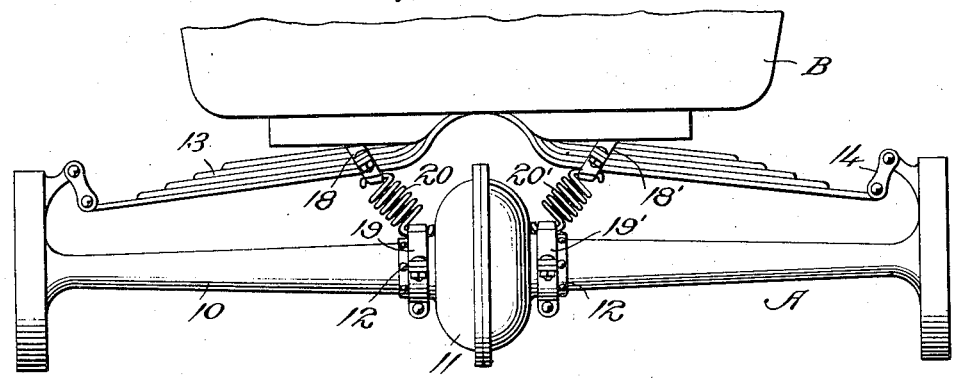
Figure 3:
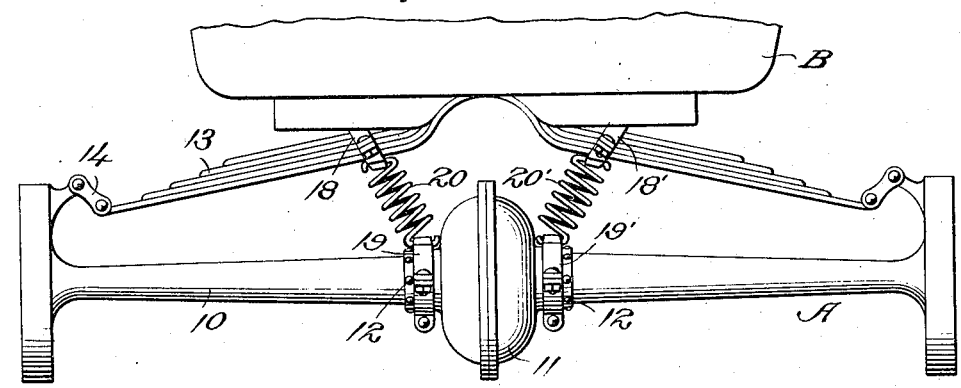
Figure 4:
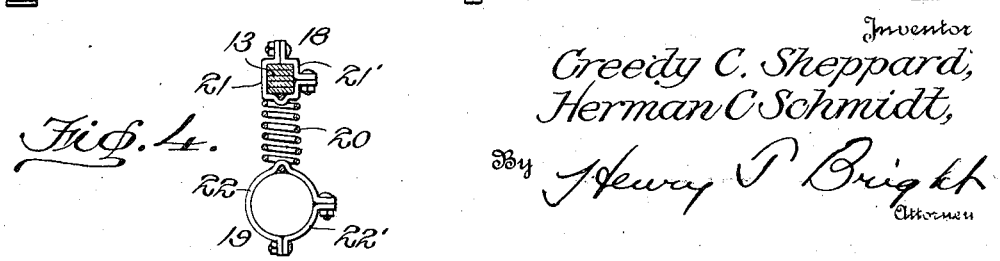

Fig. 1 is a rear elevation of a portion of an automobile equipped with our improved devices in the positions they normally occupy;

Fig. 2, a similar view showing the position of the devices when the vehicle springs are subjected to excess load;

Fig. 3, a similar view showing the position of the devices upon rebound movement of the vehicle springs;

Fig. 4, a section on the line 4—4 of Fig. 1;

Fig. 5, a view similar to Fig. 1 showing the devices as applied to the front portion of an automobile;

Fig. 6, a view illustrating a slight modification of the device as disclosed in the preceding figures;

Fig. 7, a graphic illustration of the action of our devices; and

Fig. 8, a perspective of the clip for securing the spring devices to the front axle.

Referring to the drawings in detail A designates a portion of the running gear of a vehicle including a rear axle housing 10 provided with the usual differential casing 11 secured to the housing 10 by bolts 12. The body B of the vehicle is supported upon the leaf spring 13 which has its ends flexibly connected to the axle housing by the usual links 14. The running gear also includes a front axle 15 of substantially L-shape in cross section and a front leaf spring 16 flexibly connected in the usual manner to the front axle by links 17.

In applying the devices of our invention to the rear portion of the vehicle we secure to the spring 13 or to a portion of the body B a pair of clips or shackles 18, 18′ and to a suitable portion of the running gear A we secure a second pair of clips or shackles 19, 19′. These clips provide means whereby the ends of a pair of coil springs 20, 20′ may be attached respectively to the running gear A and to the spring 13 or to a portion of the body B. We prefer, as illustrated in the drawings, to secure the clips 18, 18′ to the spring 13 and the clips 19, 19′ to the rear axle, as these parts furnish a convenient structure for the application of our invention to the vehicle. It is apparent, however, that the clips and auxiliary springs may readily be located elsewhere. Preferably we disalign the clips 18, 18′ with respect to the clips 19, 19′ so that the springs 20, 20′ when in place between the rear axle and spring 13 will be disposed at upwardly divergent angles with respect to the vertical center of the vehicle in order that the auxiliary springs may function to prevent side sway of the body B.

To produce an artificial load upon the spring 13 we extend or in other words expand the auxiliary springs 20, 20′ in any suitable manner and hold them in extended position during the operation of securing their ends to the running gear and spring 13 respectively, following which operation the holding means is released, whereupon the auxiliary springs contract and pull the leaf spring in the direction of the axle. The auxiliary springs are of a tension to produce a load upon the leaf spring corresponding substantially to the normal or capacity load of the body B, but are of insufficient tension to pull the spring 13 to its full limit of movement in the direction of the rear axle, the result being that the auxiliary springs are extended beyond their normal length when the spring 13 is under normal load.

From the foregoing it will be observed that as the load on the spring 13 increases, forcing the spring 13 towards the axle, the artificial load produced by the auxiliary springs 20, 20′ decreases and upon the load reaching a predetermined weight the auxiliary springs will assume their normal length, following which, if the weight of the load be additionally increased with a resultant further movement of the spring 13 in the direction of the axle, a reversal of the original action of the auxiliary springs will occur due to the same being compressed so that further movement of the spring 13 towards the axle will be retarded. Excessive rebound following a quick depression of the spring 13 will likewise be checked by the auxiliary springs as soon as rebound has returned the auxiliary springs normal length. Figures 1, 2 and 3 of the drawings are representative of the relative positions of the spring 13 and the auxiliary springs 20, 20′ during operation of our devices. The characteristics of our auxiliary springs will depend directly upon the weight of the body, the characteristics of the main springs and the construction of each. However, in each type of vehicle the characteristics of the springs are as illustrated in the graphic Figure 7, wherein the diagonal line $A^a$ represents the main spring characteristics and $ff'$ $EO'$ the auxiliary spring characteristics, $ob$, the weight of the car body or W, $og$, the weight of the car body plus the live load in the car, or $W_1$, $oB$, the distance between the running gear and the car body for load W, $oG$, the distance between the gear and the car body for the load $W_1$, $(P'\ N\ P)-W+(N\ P)$ or $(N-P)$ the auxiliary spring load. $(D\ M\ D')=W'$ plus $(M\ D)$ or $M-D$ the auxiliary spring load. O E represents the distance between the running gear and the body at which the action of the auxiliary springs reverse, and O F the distance at which the auxiliary springs become solid. This arrangement tends to produce practically the same tension on the vehicle springs for all body loads in its normal working range. Furthermore, it permits an unhampered functioning of the main spring or springs within predetermined limits and acts quickly with progressively increasing tension to either buff or cushion the main springs when they move beyond their normal working range.

The clips or shackles for securing the ends of the auxiliary springs 20, 20′ to the running gear and main spring or body may be of any desired construction, but for cheapness of manufacture, simplicity of construction and installation and general efficiency we prefer the form of shackles illustrated in Figure 6 of the drawings. Shackles 18, 18′ are similar in construction and are stamped or otherwise formed from suitable sheet metal, being produced in two angular sections 21, 21′ provided with suitable bolt receiving flanges whereby the sections may be clamped to the spring 13, section 21 including an eye to receive an end of auxiliary spring 20. Shackles 19, 19′ are likewise produced in two sections 22, 22′ and provided with suitable bolt receiving flanges whereby the section may be clamped to the rear axle housing 10, section 22 including an eye to receive an end of auxiliary spring 20. Preferably we arrange our shackles 19, 19′ between the enlarged portion of the differential casing 11 and the bolts 12 in order that advantage may be taken of these parts of the running gear to prevent creeping of the shackles along the axle housing.

Auxiliary springs 23, 23' may be associated with the front portion of the running gear and body to relieve this portion of a vehicle of shocks and jars and as illustrative of one method of making our devices adjustable we extend and screw-thread the lower ends of these springs and engage them with screw threaded openings in a clip or shackle 24. This shackle includes a body portion adapted to underlie the front axle and an overhanging finger or fingers 25 for engaging the lower inner flange of the axle, a set screw in a boss on the shackle cooperating with the finger 25 by engaging the front portion of the axle to secure the shackle in place. The upper ends of the springs may be secured by any suitable type of shackles to the front spring, but we prefer to engage them with the bolts 26 commonly employed for securing the body frame to the front spring.

In Fig. 6 we illustrate a very desirable form of our invention which is particularly useful in connection with those vehicles wherein the supporting springs are of either the elliptical, overhung or underhung type and extend longitudinally of the vehicle. In this form of our invention the auxiliary spring is constructed with a deflection section 30 and cantilever ends 31 and 32. Where this auxiliary spring is employed in conjunction with an elliptical spring as shown the ends 31 and 32 are simply secured in place by the usual shackles 33 and 34, respectively, which, as is well known, constitute standard parts in vehicles of this type. By this arrangement it will be apparent the necessity of the provision of independent or special fastening devices is eliminated. Where this form of auxiliary spring is utilized in those constructions wherein an elliptical spring is not employed a special fastening device is only required to secure one of the cantilever ends to the chassis.

It is believed that the construction, operation and advantages of our invention will now be fully understood as disclosed in the best form known to us at present, that is, as embodied in elastic devices in the form of auxiliary springs. It is conceivable, however, to retain the advantages of our device in other types of constructions as for instance hydraulic or pneumatic devices, and to utilize the devices for purposes other than vehicle shock absorbers and to provide varying arrangements for securing the devices in position, and for such reasons we limit ourselves in the use and development of the invention only by the terms of the appended claims.

We claim—

1. The combination with a first member and a second load carrying member yieldably associated therewith, of means for maintaining a substantially uniform stress on said yieldable member for all loads within its predetermined maximum capacity.

2. The combination with a yieldable load carrying member, of means for maintaining a substantially uniform stress on said member for any load carried thereby within its predetermined maximum load capacity.

3. The combination with a support and a load carrying member yieldably mounted thereon for movement toward and away from said support, of means interposed between the support and member acting to impose a load on the member and operating to retard movements of the member toward and away from said support beyond predetermined limits.

4. The combination with a vehicle running gear, a body, and springs yieldably supporting the body upon the gear, of means interposed between the gear and body acting normally to impose a load on the springs and operating upon predetermined movement of the body toward the gear to retard said movement.

5. The combination with a vehicle running gear, a body, and springs yieldably supporting the body upon the gear, or means for placing a load upon the springs, said means maintaining an approximately constant load on the springs for any load on the body within their predetermined maximum load capacity.

6. The combination with a support and a yieldable load carrying member mounted thereon, of means for placing a load upon said load carrying member, said means maintaining an approximate constant load on said member for any load carried thereby within its predetermined maximum load capacity, and acting to check movements of said member both toward and away from said support.

7. The combination with a support and a member yieldably mounted thereon, of means interposed between the support and member acting normally to impose a load on the member and operating upon predetermined movement of the member toward the support to retard said movement.

8. The combination with a vehicle running gear and yieldable load carrying means supported thereon, of an elastic device interposed between the gear and said yieldable load carrying means acting normally to impose a load on the load carrying means and operating upon predetermined movement of said means toward the gear to retard said movement.

9. The combination with a vehicle runing gear and yieldable load carrying means supported thereon, of a spring device interposed between the gear and said yieldable load carrying means acting normally to impose a load on the body, and operating upon predetermined movement of said means toward the gear to retard said movement.

10. The combination with a vehicle running gear and load carrying means yieldably supported thereon, of a coil spring attached to the running gear and to said yieldable load carrying means, said spring normally exerting a tension to pull said means in the direction of the running gear, and acting upon a predetermined amount of movement of said means in the direction of the gear to retard its movement.

11. The combination with a vehicle running gear, a body, and a spring yieldably supporting the body upon the gear, of means for placing a load upon the springs, said means maintaining an approximately constant load on the springs for any normal load on the body and acting to buff downward movement and check upward movement of the body beyond predetermined limits.

12. The combination with a vehicle running gear and a body yieldably mounted thereon, of spring shock absorbing devices interposed between the gear and body adapted to normally operate in tension and at predetermined times adapted to operate in compression.

13. The combination of a vehicle running gear and a body yieldably supported thereon for movement toward and away from the running gear, said body having a normal load position with respect to the running gear, and means interposed between the running gear and body operating to retard a portion of both movements of the body occurring between the normal load position thereof and the running gear.

14. The combination with a vehicle running gear, a body, and springs yieldably supporting the body upon the gear, of means for placing a compensating load upon the springs, said means tending to produce an approximately constant load on the springs for any ordinary load on the body and acting to check downward movement and check upward movement of the body beyond predetermined limits.

15. The combination with a first member and a second load carrying member yieldably associated therewith, of a single means operating to maintain a substantially uniform stress on said yieldable member for all loads within its predetermined maximum capacity.

16. The combination with a support and a load carrying member yieldably mounted thereon for movement toward and away from said support, of a single means interposed between the support and member acting to impose a load on the member and operating to retard movements of the member toward and away from said support beyond predetermined limits.

17. The combination with a support and a member yieldably mounted thereon, of a single means interposed between the support and member acting normally to impose a load on the member and operating under predetermined movement of the member toward the support to retard said movement.

18. The combination of a vehicle running gear, a body, and springs yieldably supporting the body upon the gear, of a single means for placing a compensating load upon the springs, said means operating to produce an approximately constant load on the springs for any ordinary load on the body and acting to check downward movement and check upward movement of the body beyond predetermined limits.

In testimony whereof we hereunto affix our signatures in the presence of two witnesses.

HERMAN C. SCHMIDT.
CREEDY C. SHEPPARD.

Witnesses:
CARROLL BAILEY,
FLORENCE A. BLINN.